United States Patent
Dolgonos et al.

(10) Patent No.: US 7,002,934 B2
(45) Date of Patent: Feb. 21, 2006

(54) OFDM MULTIPLE UPSTREAM RECEIVER NETWORK

(75) Inventors: Alex Dolgonos, Thornhill (CA); Deming Zhang, Toronto (CA)

(73) Assignee: Unique Broadband Systems, Inc., Ontario (CA)

(*) Notice: Subject to any disclaimer, the term of this patent is extended or adjusted under 35 U.S.C. 154(b) by 828 days.

(21) Appl. No.: 09/765,383

(22) Filed: Jan. 22, 2001

(65) Prior Publication Data

US 2002/0137464 A1 Sep. 26, 2002

(51) Int. Cl.
*H04Q 7/00* (2006.01)
*H04Q 7/24* (2006.01)

(52) U.S. Cl. ................... 370/328; 370/338
(58) Field of Classification Search ............ 370/206, 370/328, 331, 338, 203, 308; 455/442, 436, 455/443; 348/722–723; 375/267
See application file for complete search history.

(56) References Cited

U.S. PATENT DOCUMENTS

| | | | |
|---|---|---|---|
| 5,452,288 A | | 9/1995 | Rahuel et al. |
| 5,568,205 A * | | 10/1996 | Hurwitz ................ 348/723 |
| 5,742,907 A * | | 4/1998 | Brown ................ 455/503 |
| 5,802,044 A | | 9/1998 | Baum et al. |
| 5,828,660 A | | 10/1998 | Baum et al. |
| 5,867,478 A | | 2/1999 | Baum et al. |
| 5,915,210 A | | 6/1999 | Cameron et al. |
| 6,005,876 A | | 12/1999 | Cimini, Jr. et al. |
| 6,038,450 A * | | 3/2000 | Brink et al. ............ 455/442 |
| 6,088,349 A | | 7/2000 | Zumkeller |
| 6,128,276 A | | 10/2000 | Agee |
| 6,144,711 A | | 11/2000 | Raleigh et al. |
| 6,396,803 B1 * | | 5/2002 | Hornsby et al. ............ 370/208 |
| 6,515,960 B1 * | | 2/2003 | Usui et al. ................ 370/203 |
| 2001/0004379 A1 * | | 6/2001 | Wilson ................. 375/148 |
| 2002/0001316 A1 * | | 1/2002 | Hornsby et al. ............ 370/487 |
| 2002/0027957 A1 * | | 3/2002 | Paulraj et al. ............ 375/267 |
| 2003/0195017 A1 * | | 10/2003 | Chen et al. ............ 455/562.1 |

* cited by examiner

Primary Examiner—Dang Ton
Assistant Examiner—Robert C. Scheibel, Jr.
(74) Attorney, Agent, or Firm—Ridout & Maybee LLP (57) ABSTRACT

A communications system for transferring signals from a wireless transmitter to a hub station, comprising a wireless transmitter configured to transmit a data signal using multiple sub-carriers, a plurality of base stations each configured to receive the multiple sub-carrier data signal and relay the multiple sub-carrier data signal to a hub station; and a hub station configured to receive and combine the multiple sub-carrier data signals from the plurality of base stations. The wireless transmitter may use an orthogonal frequency division modulation (OFDM) scheme to transmit portions of the data signal in parallel on multiple sub-carriers.

23 Claims, 8 Drawing Sheets

OFDM MULTIPLE UPSTREAM RECEIVER NETWORK

BACKGROUND OF THE INVENTION

The present invention pertains to communications systems using orthogonal frequency division modulation to communicate information from a mobile unit.

Multi-carrier modulation systems generally involve a data signal of successive symbols being split into several lower rate signals, each associated with a sub-carrier, resulting in a large symbol time compared to the expected multipath delay spread. Orthogonal frequency division modulation (OFDM) is a multi-carrier modulation scheme that maps data symbols onto N orthogonal sub-carriers separated by a distance of 1/T, where T is the useful symbol duration. In OFDM, cyclic guard intervals are frequently used to improve performance in the presence of a multipath channel.

OFDM has become attractive for wireless communications due to its high spectral efficiency and resistance to noise and multipath effects. OFDM has been the subject of numerous patents and at the foundation of a number of wireless broadcast standards, including for example the ETSI-monitored DAB and DVB-T protocols. Both of these standards provide for single frequency network (SFN) operation in which a number of transmitters operate in simulcast manner. As apparent from the DAB and DVB-T protocols, much of the focus to date on OFDM has been in respect of providing broadband, high speed downstream transmission (ie. transmission from base or repeater stations to remote wireless units). Although the concept of providing upstream data (ie. transmission of information from remote wireless units to a base station) has been considered in the context of OFDM systems, such systems have generally assumed that the transfer of data from a remote wireless unit to a base station will generally require lower speeds and less bandwidth than downstream communications.

In some applications, however, high speed, large bandwidth transfer of data from a remote unit to a central station is required. For example, mobile electronic news gathering (ENG) systems, in which audio and video signals from a news van, helicopter or other mobile vehicle are transmitted to a central news gathering facility, require high data rate upstream communications. Furthermore, as such systems are often used in high density urban areas, they require robust, multipath resistant, communications channels. When the mobile units are moving while transmitting, the channel must also be resistant to the effects of Doppler spread.

Thus, there is a need for an OFDM communications system that provides for robust, economical, high data rate wireless transfer from a remote mobile transmitter to a central station. An electronic news gathering system having these features is also desirable.

SUMMARY OF THE INVENTION

In the present invention, a plurality of base stations are configured to substantially simultaneously receive multi-carrier modulated symbols from one or more wireless transmitters, and relay the multi-carrier modulated symbols to a hub station for demodulation.

According to one aspect of the invention, there is provided a communications system for transferring signals from a wireless transmitter to a hub station. The system includes a wireless transmitter configured to transmit a data signal using multiple sub-carriers, a plurality of base stations each configured to receive the multiple sub-carrier data signal and relay the multiple sub-carrier data signal to a hub station, and a hub station configured to receive and combine the multiple sub-carrier data signals from the plurality of base stations. In one preferred embodiment, at least some of the base stations are connected to the hub station by wired communications links According to a further aspect of the invention, there is provided a communications system for transferring information from a wireless transmitter to a hub station, including a plurality of wireless transmitters, each configured to transmit a data signal as successive OFDM symbols. The system includes a plurality of base stations, each configured to receive OFDM symbols from the wireless transmitters located in a corresponding coverage area and relay the received OFDM symbols to a hub station, at least some of the base stations having overlapping coverage areas such that more than one base station can receive the same OFDM symbols from the same mobile transmitter. A hub station is configured to receive the OFDM symbols from the base stations and demodulate the OFDM symbols and output an estimate of the data signals from the wireless transmitters. Preferably, the hub station is configured to combine signals received from the different base stations. Additionally, at least some of the base stations may be connected to the hub station by independent wired communications links having predetermined propagation delays, the hub station including buffering to substantially eliminate, prior to combining signals received on the communications links, any delay spread resulting from the predetermined propagations delays.

According to a further aspect of the invention, there is provided a method for providing data signals, the method including (a) receiving at a plurality of base stations data signals transmitted from a mobile wireless transmitter using multiple sub-carriers, and relaying the data signals using multiple sub-carriers from the plurality of base stations to a hub station; and (b) receiving and combining at the hub station the data signals from the plurality of base stations.

DESCRIPTION OF THE PREFERRED EMBODIMENTS

Figure 1:
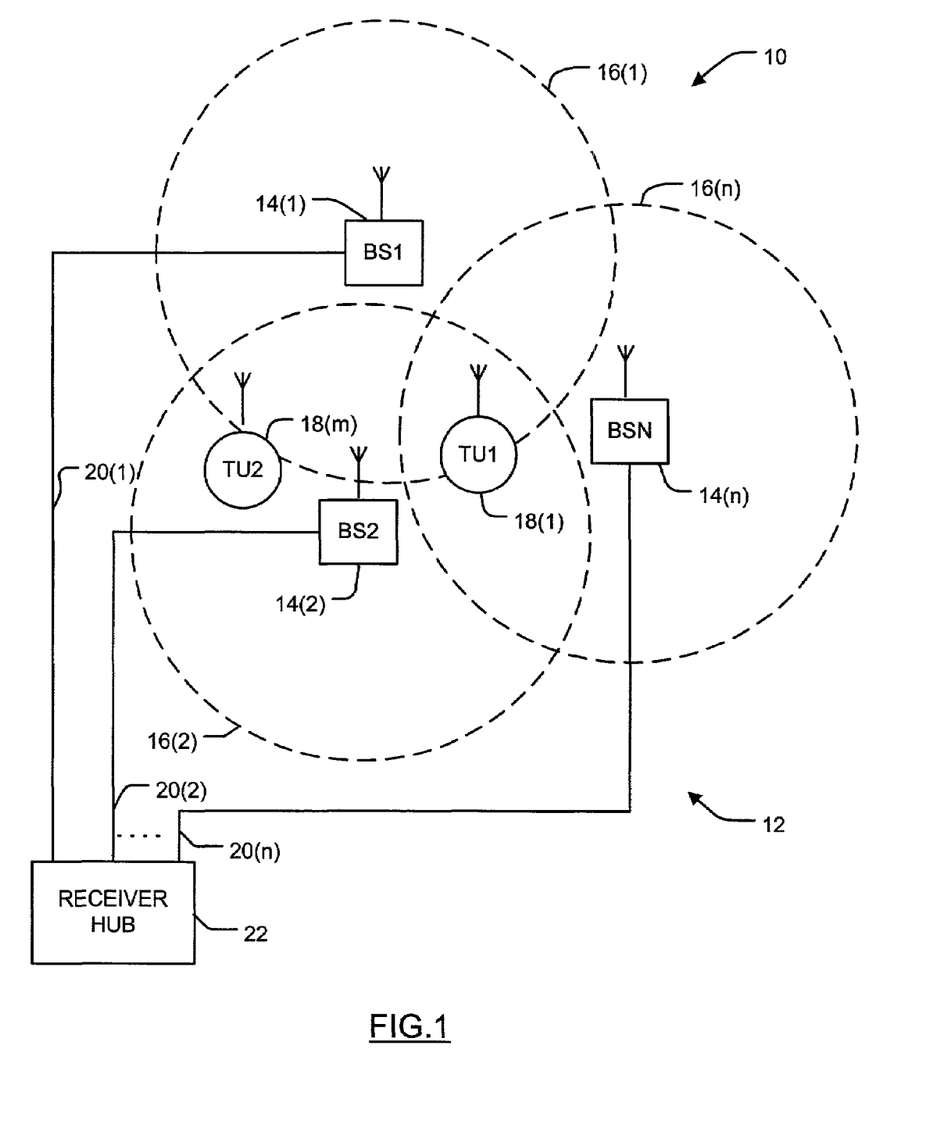
FIG. 1 shows a wireless communications system in accordance with an embodiment of the present invention.

FIG. 1 shows a wireless communications system 10 used in accordance with certain embodiments of the present invention. The wireless communications system 10 receives wireless communications signals from a geographic area 12. Within the geographic area 12 are a plurality of base station receivers 14(1)–(n), each of which receives wireless communications signals from a corresponding coverage area, or cell, 16(1)–(n). For the sake of simplicity, the coverage areas 16(1)–(n) have been illustrated as circular areas, but in reality such areas will generally have irregular shapes that are dependent on a number of factors including the terrain and environment of the geographic area 12, as well as the strength of the transmitted signals to be received. Although only three coverage areas have been illustrated, the communications area can include additional coverage areas, or as few as two coverage areas. As indicated in FIG. 1, in order to provide for continuous coverage of the geographic area 12, a number of the coverage areas 16(1)–(n) are mutually overlapping. The use of overlapping coverage areas provides receive diversity, and can help overcome problems such as shadowing.

The base station receivers 14(1)–(n) are each configured to receive signals transmitted from a plurality of mobile transmitter units 18(1)–(m). In particular, at any given time each base station receiver 14(1)–(n) will receive transmissions from any mobile transmitters 18(1)–18(m) that are located within its corresponding coverage area 16(1)–(n). The base station receivers 14(1)–(n) are fixed terminals, each of which has a respective communications link 20(1)–(n) with a central receiver hub 22. The base station receivers 14(1)–(n) are essentially repeater stations in that they receive information from the mobile transmitters, and then transfer that information to the receiver hub 22 via communications links 20(1)–(n). The communications links 20(1)–(n) can be wired (including, for example, fibre, coaxial cable, twisted pair, etc.) or wireless links.

Figure 2:
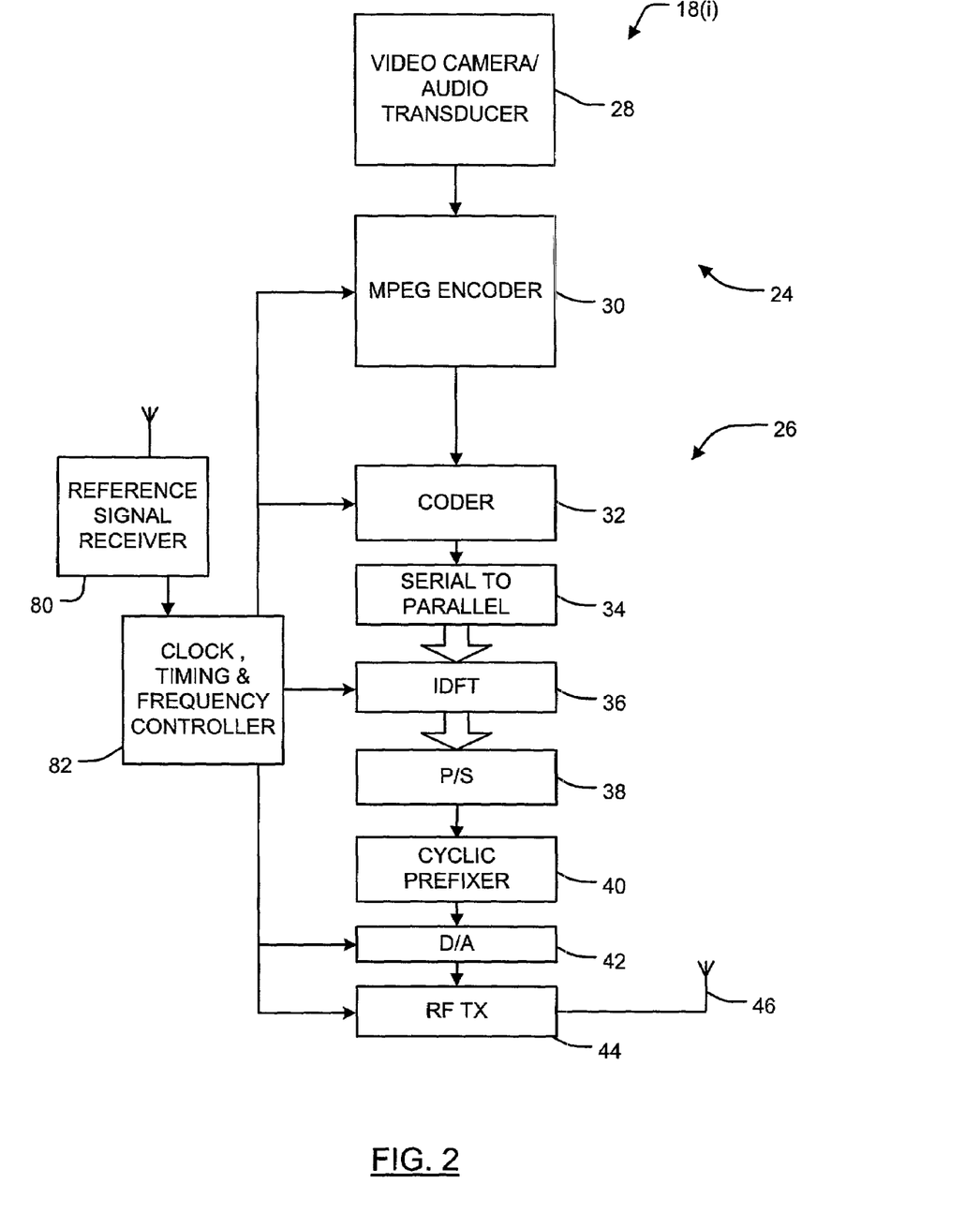
FIG. 2 shows a block diagram of a mobile transmitter that can be used in the communications system.

In certain embodiments, the communications system 10 uses multiple sub-carrier modulation techniques such as orthogonal frequency division modulation (OFDM). FIG. 2 shows a general block diagram of a mobile transmitter unit 18(i) (which could be any one of transmitter units 18(1) to 18(m)) that includes a data source 24 and an OFDM transmitter 26. In a preferred embodiment, the mobile transmitter unit 18(i) is used for live electronic news gathering, and thus includes at lease one video camera and audio transducer 28 for capturing video images and accompanying audio. Conveniently, the transmitter unit 18(i) may include a video/audio data compression system, such as an MPEG-2/MUSICORE (trademark) encoder 30 for digitizing and compressing the data captured by camera 28. The OFDM transmitter 26 receives a stream of digital data from the data source 24. A coding block 32 receives that data stream and introduces redundancy for forward error correction coding and constellation maps the data stream. In this particular embodiment, quadrature phase shift keying (QPSK), 16 quadrature amplitude modulation (QAM) or 64 QAM constellation is used to modulate the data, although other modulation formats could be used. A serial to parallel converter 34 partitions the coded data stream into successive groups or blocks of bits. In this particular embodiment, the blocks of coded data bits are input into an N-points complex Inverse Discrete Fourier Transform 36 (which may be an Inverse Fast Fourier Transform), where N corresponds to the number of sub-carriers. In this embodiment, the IDFT 36 is performed on blocks of $M*N_c$ coded data bits, where $M*N_c$ is the total number of bits in an OFDM symbol (for QPSK, M=2; for 16 QAM, M=4; for 64 QAM, M=8) output by transmitter 18(i). The $M*N_c$ bits are converted into $N_c$ complex numbers which are used to modulate $N_c$ sub-carriers. $N_c$ can be equal to N but should be less than N to produce an over sampled signal. The extra $N-N_c$ sub-carriers can be set to zero.

The output of IDFT 36 is parallel-to-serially converted by parallel-to-serial converter 38 to produce an OFDM symbol for transmission. To decrease sensitivity to inter-symbol and inter-carrier interference, the cyclic prefixer 40 creates a guard interval by copying the last part of the OFDM symbol and augmenting the OFDM symbol with the copied portion of the OFDM symbol. As known in the art, cyclic prefixing contributes to making OFDM transmissions resistant to multipath effects. Instead of a prefix, the guard interval could be a cyclic extension at the end of the OFDM symbol. The OFDM symbol is input into a digital-to-analog converter 42 after which it is sent to the transmitter front-end 44 that converts the baseband waveform to the appropriate RF form for transmission via antenna 46. As known in the art, the transmitter front-end 44 includes, among other things, an up-converter for modulating the OFDM symbol onto an RF carrier frequency for over-the-air transmission.

Typically, the wireless spectrum allocated to the communications system 10 will be shared among a plurality of mobile transmitter units at any given time. The spectrum could be shared in a number of different ways. For example, each transmitter unit 18(i) may have a full channel (for example 6 MHz in the MMDS band) assigned for its exclusive use. In such a configuration, at the receiving end a separate OFDM receiver would typically be required for each full channel in order to simultaneously process incoming signals from different mobile units 18(i). Alternatively, the channel could be shared between the mobile transmitter units 18(i) using frequency, time and/or code division techniques. In the event that the channel is shared, each mobile transmitter unit 18(i) will generally require an external reference signal in order to coordinate use of the channel. In this respect, a preferred embodiment of the OFDM transmitter 26 includes a reference signal receiver 80 for receiving an external reference, and a clock/timing/frequency controller 82 for controlling the clock of data source 24 and the timing and frequency of the OFDM symbols output from the transmitter. In this preferred embodiment, the reference signal receiver 80 is a Global Positioning Signal (GPS) receiver that receives signals from GPS satellites. Such signals include a 10 MHz frequency reference signal and a 1 PPS time reference signal.

In the present embodiment of the invention, the transmitter units 18(1)–(m) share an upstream data channel by each using a predetermined subset of the OFDM sub-carriers available in the channel. Thus, each transmitter 18(i) produces OFDM symbols that are in fact, from the perspective of the central hub, OFDM sub-symbols. The combined output of all active transmitters 18(1)–18(m) forms a complete OFDM symbol. In this embodiment, the sub-carriers assigned to each transmitter 18(i) are contiguous, with unused sub-carriers acting as guard bands between the sub-carrier subsets. However, it would also be possible to use non-contiguous sub-sets of sub-carriers, and furthermore, to use frequency hopping such that the sub-sets change over time. In the present embodiment, in order to form a valid OFDM symbol, the timing of the symbol generation by each of the transmitters 18(1)–(m) is synchronized by reference to a common GPS clock reference. The timing synchronization must be such that at the OFDM demodulator the timing offset between symbols from different transmitters, and from different paths, is not greater than the symbol guard interval. Preferably, in order to ensure orthogonality between OFDM sub-carriers, frequency spacing is performed at each transmitter 18(i) with reference to a common GPS frequency reference. It will be appreciated that a different common clock/frequency reference signal could be used. For example, in a two-way communication system, synchronization could be based on downstream signals originating at the hub station.

In the present embodiment, in order to facilitate use of the GPS reference signals, upstream data transmissions are carried out using successive OFDM data frames each of which comprise a predetermined number of successive OFDM symbols. Each frame may include preamble symbols that may include training symbols for training the OFDM receiver and indicating the start or end of a frame. In order to synchronize OFDM symbol transmission, the transmitters 18(1)–(m) may follow a predetermined protocol that defines time points at which all mobile transmitters are permitted to start transmitting a frame of OFDM symbols. The protocol may further, or alternatively in a non-frame environment, define time points at which individual OFDM symbols may be sent.

Figure 3:
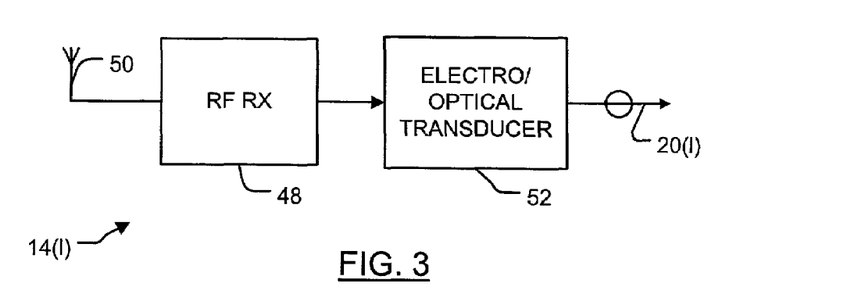
FIG. 3 shows a block diagram of a base station that can be used in the communications system.

FIG. 3 shows a block diagram of one embodiment of a base station 14(k) (which could be any one of base stations 14(1)–(n)). Each base station 14(k) receives the OFDM symbols that are transmitted by mobile transmitter units 18(1)–(m) located in its coverage area 16(k). Thus, in each coverage area 16(1)–16(n), the OFDM symbols from each transmitter are combined during wireless transmission. The base station 14(k) is connected by a wired link 20(k), which in the illustrated embodiment is fibre optic cable, to the receiver hub 22. The OFDM signals from the mobile transmitter units 18(1)–(m) in area 16(k) are received at the antenna 50 and processed using receive circuitry 48. In this particular embodiment, receive circuitry 48 filters and amplifies the carrier frequency modulated OFDM symbols, which are then provided, with proper or without RF conversion, to electro-optical transducer 52 which modulates the OFDM symbols onto a light beam for transmission over fibre optic link 20(k). Analog or digital optical modulation techniques could be used.

Figure 4:
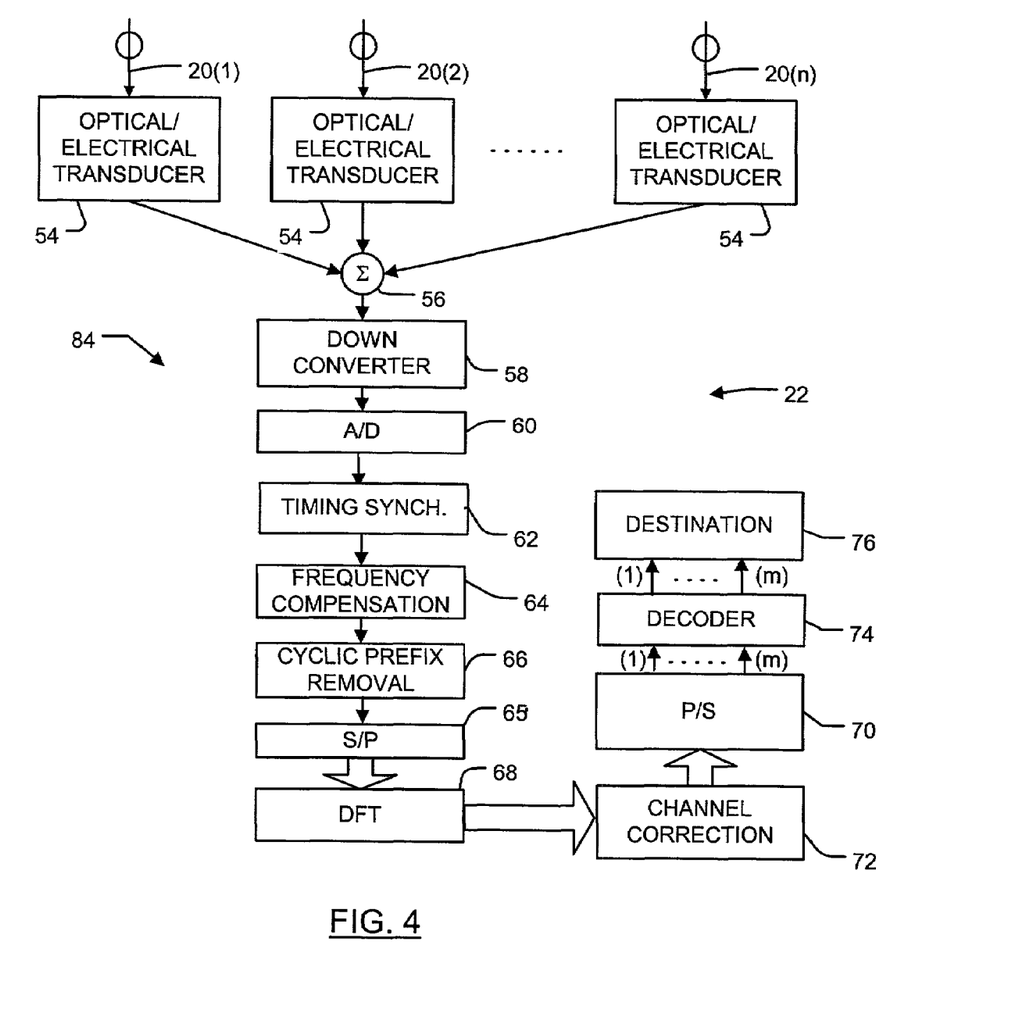
FIG. 4 shows a block diagram of a hub station that can be used in the communications system.

FIG. 4 shows a block diagram of an embodiment of a receiver hub station 22. In this embodiment, the signals from each base station 14(1) to 14(n) are treated as multipath signals and simply summed together and provided to a common OFDM demodulator 84. The hub station 22 has n optical/electrical transducers 54, each of which receives signals from an associated base station 14(1)–14(n) via communications links 20(1)–20(n), respectively. Each optical/electrical transducer 54 performs the opposite function of base station transducer 52 to produce an analog electrical signal representative of the OFDM symbol originally received by its associated base station 14(1)–(n). The outputs of the n transducers 54 are summed together at summer 56. It will be appreciated that as a system constraint, in order to maintain orthogonality the delay in arrival at the summer 56 between the earliest multipath OFDM symbol and latest multipath OFDM symbol for a single OFDM symbol should not exceed the OFDM symbol guard time. In the present embodiment, multipath-like delay will contributed to by differing lengths of wired communications links 20(1)–20(n) and if possible the system 10 may conveniently be arranged in the geographic area 12 to minimize differences between the lengths of links 20(1)–20(n). As noted below, as the propagation delays in links 20(1)–20(n) can be predetermined, buffering can be introduced prior to summer 56 to equalize the delays between the different links.

The summed OFDM symbol from summer 56 is down converted to a baseband OFDM symbol by downconverter 58, and sampled by analog to digital converter 60 to produce a digital signal. The digital OFDM signal is received by a frequency compensation block 64 and a timing and frequency synchronization block 62. The timing and frequency synchronization block 62 acquires the OFDM symbol timing and provides a frequency estimate signal to the frequency compensation block 64 to correct for frequency offset and a timing signal to a cyclic prefix remover 66. The frequency corrected OFDM signal is provided to cyclic prefix remover 66, after which it is serial-to-parallel converted by a serial-to-parallel converter 65 and provided to Discrete Fourier Transform (DFT) 68 (which in the preferred embodiment is an Fast Fourier Transform). The DFT 68 is designed to perform an $M_h$-point discrete fourier transform on the sub-carriers making up the OFDM symbol received by the hub station 22. In the present embodiment in which the transmitters 18(1)–(m) each use a sub-set of sub-carriers, $M_h$ is equal to or generally greater than the total number of carriers in all the sub-sets, (ie.

$$M_h \geq N_d = \sum_{i=1}^{m} N_i,$$

where $N_1$ is the number of sub-carriers used by transmitter 18(i)). The resulting $N_d$ of $M_h$ complex sub-carriers are subjected to channel correction by channel corrector 72, and then provided to a parallel to serial converter 70. In the present embodiment, P/S converter 70 has m outputs (one for each of the m transmitters sharing the uplink channel), and groups the complex sub-carriers accordingly. Thus, converter 70 is effectively a block of m P/S converters, each operating on a predetermined set of sub-carriers, each group of sub-carriers being associated with particular transmitter unit. The m outputs of P/S block 70 are decoded at decoder 74, after which the m signals are provided to a data sink 76 (which in the case of an ENG system may be a news editing and broadcasting centre).

With reference to FIGS. 1–4, an example of the operation of the communications system 10 will now be briefly discussed. In the example, mobile transmitters 18(1) and 18(m) are associated with news gathering vans and accordingly transmit video and audio information. As shown in FIG. 1, transmitter 18(1) is positioned in a location where three coverage areas 16(1)–16(n) overlap, and transmitter 18(m) is positioned in a location where two coverage areas 16(1)–16(2) overlap. All transmitter units 18(1)–(m) have been assigned a unique sub-set of $N_c$ sub-carriers in an $N_d$ sub-carrier channel, and are transmitting successive frames of OFDM sub-symbols using such sub-carriers. Each of the transmitter units 18(1)–(m) obtains a GPS frequency and timing reference such that all transmitters use substantially orthogonal sub-carriers and start transmission of an OFDM frame at substantially the same time. Base station 14(1) receives, via a number of paths, combined signals that include the sub-symbols from both transmitter units 18(1) and 18(m). Similarly, base station 14(2) receives sub-symbols from both transmitters, and base station 14(n) receives sub-symbols from transmitter 18(1), but not transmitter 18(m). Each of the base stations 14(1) to 14(n) optically modulate the OFDM signals that they receive, and send the signals over fibre links 20(1)–20(n) to the receiver hub station 22, which is remotely located from at least some of the base stations. At the receiver hub 22, the OFDM signals from all base stations 14(1) to 14(n) are converted back to electrical signals, summed together, and then provided to an OFDM demodulator 84 which treats the summer output as a single OFDM symbol. The signals from each of the independent transmitters are separated at the parallel to serial converter 70 of the OFDM demodulator 84.

In this embodiment, the $N_d$ frequency bins of the OFDM demodulator 84 are frequency divided amongst the transmitters 18(1)–18(m). However, the system could alternatively use time division multiplexing in which the each transmitter 18(1)–18(m) used the substantially all of the channel bandwidth (ie. all frequency bins) in unique time slots. In such a system, the individual transmitter signals would typically be demultiplexed after decoder 74, rather than at P/S converter 70. A combination of frequency division and time division multiplexing could also be used.

Although the communications links 20(1)–20(n) have been described above as fibre links, other wired links such as coaxial cable or twisted pair could be used. In non-optical wired links, electro/optical and optical/electrical transducers are not required and base stations 14(1)–(n) could simply include pass band filtering and amplification of received signals. Also wireless links could alternatively be used between the base stations and the hub station, with base stations 14(1)–14(n) acting as wireless repeaters. Typically, in such systems the base stations would have frequency shifting capabilities to modulate received OFDM signals onto different carrier frequencies. If frequency conversion or other frequency or time dependent processing is performed at the base stations 14(1)–14(n), the stations may be equipped with GPS receivers so that all stations can reference a common frequency and/or clock reference. In a wireless base-station/hub system, adaptive antenna arrays using beam forming could be used at the hub station.

Figure 5:
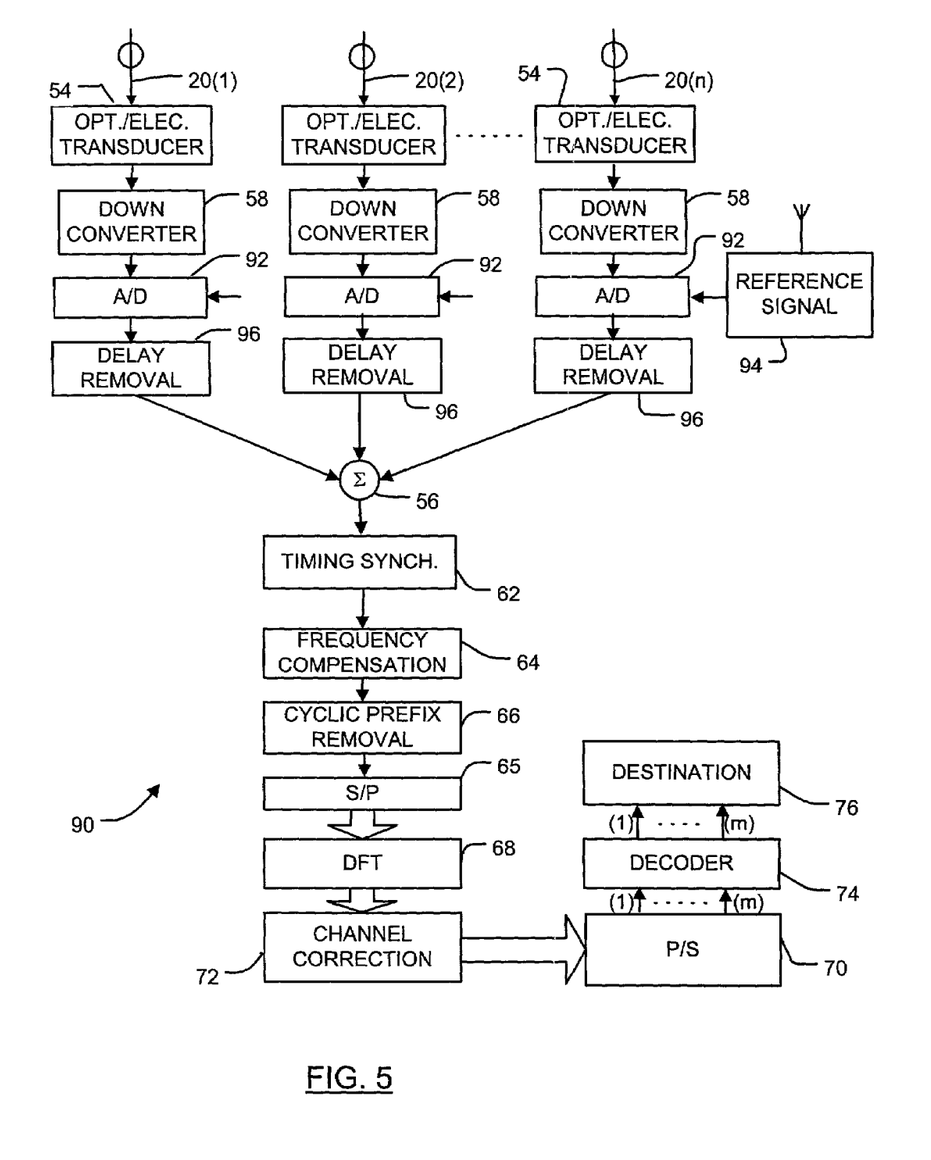
FIG. 5 shows a block diagram of a further hub station that can be used in a further embodiment of the communications system.

In further embodiments of the communications system 10, the receiver hub is configured so that some of the OFDM symbol demodulation processing steps are performed prior to summing the symbols from different base stations. Such a configuration permits the symbols from different base stations to be treated differently. A further embodiment of a receiver hub 90 is shown in FIG. 5. The receiver hub 90 is similar to hub 22, with the following differences. The receiver hub 90 is configured to eliminate the different propagation delays that result in different links 20(1) to 20(n). As the difference in relative propagation times for each of the links 20(1) to 20(n) can be predetermined, buffering the signals accordingly permits differences in wired link propagation times to be substantially eliminated, thereby allowing for a shorter guard interval in OFDM symbols. In this embodiment, a separate down converter 58 and analog to digital converter 92 is used for each base station link 20(1) to 20(n) with the result that the down conversion and A/D conversion steps occur before summer 56. A delay removal buffer 96 is provided after each analog to digital converter 92 to delay the signal a predetermined amount of time as required by the particular communications link. In order to synchronize the operation of A/D converters 92, a common reference signal source 94 provides a common clock reference to all the A/D converters 92. Conveniently, the common reference source can be a GPS receiver for receiving a GPS clock reference signal. In order to reduce the number of down converters 58, A/D converters, and delay removal buffers 96, communications links 20(1) to 20(n) can be grouped into sub-groups having substantially the same propagation delay, with the signals for each sub-group being summed together, and the summed sub-group then provided to a down converter-A/D converter-delay removal processing chain.

Figure 6:
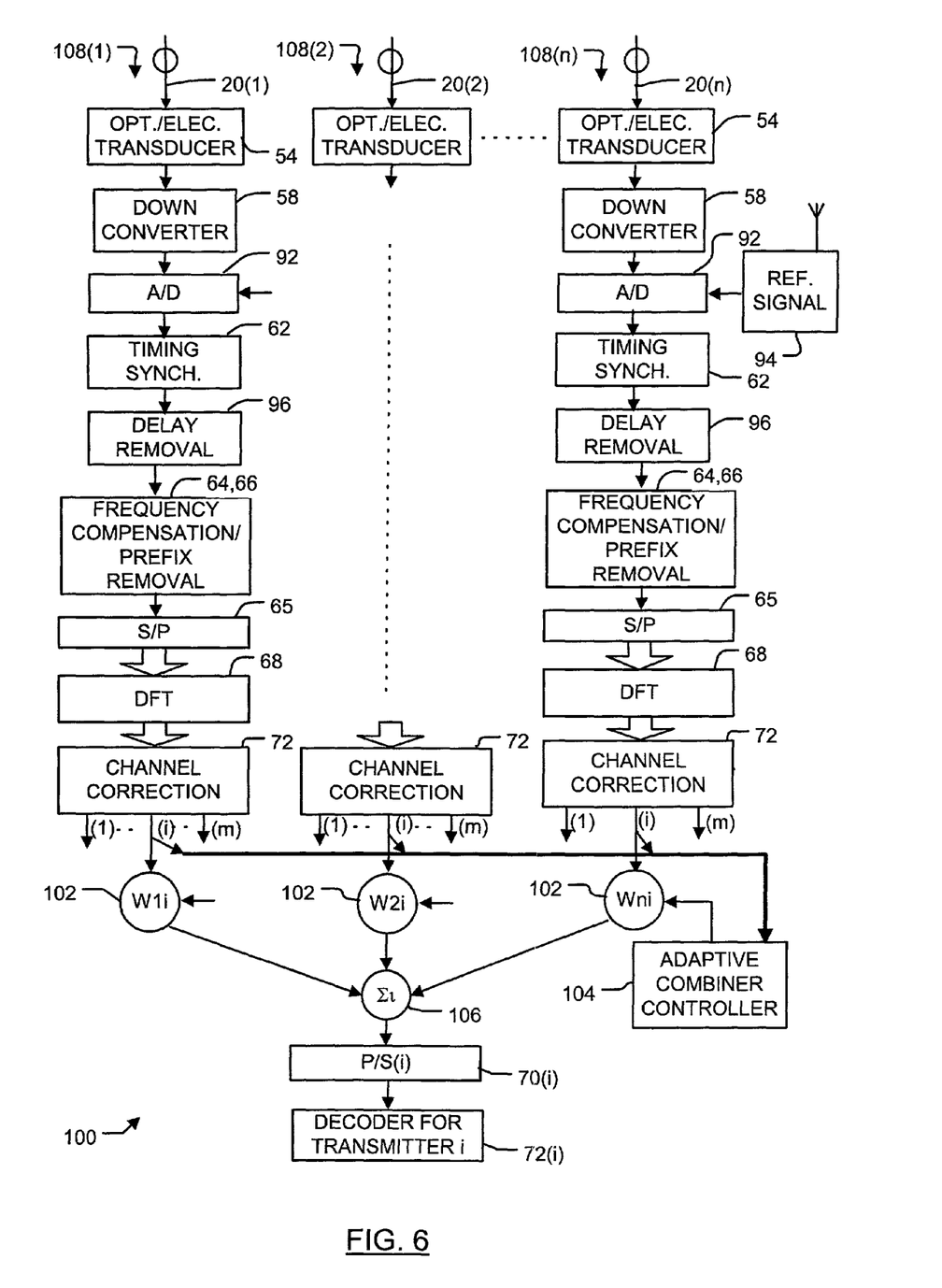
FIG. 6 shows a block diagram of another hub station that can be used in yet a further embodiment of the communications system.

Yet a further embodiment of a receiver hub station 100 is shown in FIG. 6. The receiver hub 100 is configured to perform most of the OFDM demodulation steps prior to combining the signals from the different communications links, and to then adaptively combine the signals based on the received signal characteristics. In particular, hub station 100 performs, independently for each of the n base stations, all demodulation steps up to and including channel correction. Thus, the hub station 100 includes a separate processing branch 108(1)–(n) for the signals from each communications link 20(1)–(n), each branch including OFDM demodulation components from down converter 58 to channel correction block 72. Note that after timing synchronization 62 the delay removal 96 uses the knowledge of predetermined propagation delay in each branch to remove the delays accordingly so that the input to frequency compensation 64 in all branches will be well synchronized. A common reference signal to synchronize the sample frequency of each A/D converter is necessary. In the embodiment illustrated, each transmitter 18(1) to 18(m) uses a predetermined set of sub-carriers, and accordingly, the channel correction block 72 for each processing branch 108(1)–(n) has m groups of parallel outputs, each group containing the complex sub-carriers associated with a particular transmitter. This permits the signals recovered for each transmitter 18(1) to 18(m) to be combined according to weightings chosen for each transmitter. FIG. 6 illustrates processing done in respect of signals received from the exemplary transmitter 18(i) at the output of branches 108 (1)–(n). In particular, the processed signals in respect of the mobile transmitter 18(i) are provided to an adaptive combiner controller 104 that determines appropriate weighting coefficients based on measured signal power and/or SNR of the signals. The signals for transmitter 18(i) from each of the processing branches 108(1)–(n) are combined (via complex weighting devices 102, wherein each of them is a collection of weighting coefficients in accordance with the sub-carriers assigned to the transmitter unit 18(i), and summer 106) in accordance with the calculated weighting coefficients. The combined signals are then provided to parallel to serial converter 70(i) and subsequently to a decoder 72(i) which outputs the hub station's estimate of the signal that was originally created by the data source 24 of the remote transmitter unit 18(i). Using various predetermined algorithms, the signals outputted by the hub station can be optimized for each of the individual transmitters 18(1) to 18(m).

In a preferred embodiment of the invention, the following algorithm is used by the adaptive combiner controller 104 to obtain a maximum SNR. Unlike the signals from the branches of a typical antenna array, the signals from the different base stations 14(1)–(n) will generally be substantially different from each other due to the spatial separation of the base stations. It will be understood that at any given time, not all of the processing branches 108(1) to 108(n) will be receiving signals from the transmitter 18(i) as the transmitter may not be located in the coverage area(s) 16(1)–(n) associated with one or more of the processing branches. Suppose there are N branches on which signals from transmitter 18(i) are detected. Each branch has the same $k^{th}$ sub carrier with different complex amplitude $S_{qk}$, q=1~N, and suppose the noise is $n_{qk}$ and its power is $N_{qk}=\overline{|n_{qk}|^2}$, which are independent of each other. The signals $S_{qk}e^{j\omega_k t}$, where $\omega_k$ is the $k^{th}$ subcarrier frequency, and the noises are combined using weight coefficients $w_{qk}$. Then the SNR of the combined signal can be estimated as shown below:

$$SNR_{comb,k} = \frac{\left|\sum_q S_{qk}e^{j\omega_k t}w_{qk}^* / \sum_q w_{qk}^*\right|^2}{\overline{\left|\sum_q n_{qk}w_{qk}^* / \sum_q w_{qk}^*\right|^2}} = \frac{\left|\sum_q S_{qk}w_{qk}^*\right|^2}{\sum_q N_{qk} \cdot |w_{qk}|^2} = \tag{1}$$

$$= \frac{\left|\sum_q \frac{S_{qk}}{\sqrt{N_{qk}}}\sqrt{N_{qk}}w_{qk}^*\right|^2}{\sum_q |\sqrt{N_{qk}}w_{qk}|^2}$$

$$= \frac{\left|\sum_q \beta_{qk}g_{qk}^*\right|^2}{\sum_q |g_{qk}|^2} = \frac{|G_k^H B_k|^2}{|G_k|^2} = \left|\frac{G_k^H}{|G_k|}B_k\right|^2$$

Where:

$$B_k^T = [\beta_{1k}, \beta_{2k}, \ldots, \beta_{Nk}] \tag{2}$$

$$\beta_{qk} = \frac{S_{qk}}{\sqrt{N_{qk}}}, q = 1, 2, \cdots, N \tag{3}$$

$$G_k^T = [g_{1k}, g_{2k}, \ldots, g_{Nk}] \tag{4}$$

$$g_{qk} = \sqrt{N_{qk}}w_{qk}, q = 1, 2, \ldots, N \tag{5}$$

It will be appreciated that the maximal $SNR_{comb}$ can be reached if the vector $G_k$ is in the same "direction" of the vector $B_k$, regardless of the vector length. A particular solution is:

$$G_k^T = B_k^T = [\beta_{1k}, \beta_k, \cdots, \beta_{Nk}] = \left[\frac{S_{1k}}{\sqrt{N_{1k}}}, \frac{S_{2k}}{\sqrt{N_{2k}}}, \cdots, \frac{S_{Nk}}{\sqrt{N_{Nk}}}\right]. \tag{6}$$

The weight vector for the $k^{th}$ sub carrier is therefore:

$$W_k^T = [w_{1k}, w_{2k}, \cdots, w_{Nk}] = \left[\frac{S_{1k}}{N_{1k}}, \frac{S_{2k}}{N_{2k}}, \cdots, \frac{S_{Nk}}{N_{Nk}}\right]. \tag{7}$$

Then, the maximal reachable $SNR_{comb}$ is:

$$SNR_{comb,max} = \tag{8}$$

-continued $$\frac{\left|\sum_q S_{qk}w_{qk}^*\right|^2}{\sum_q N_{qk}|w_{qk}|^2} = \frac{|B_k^H B_k|^2}{|B_k|^2} = |B_k|^2 = \sum_q \frac{|S_{qk}|^2}{N_{qk}} = \sum_q SNR_{qk}$$

The combined complex amplitude of the $k^{th}$ sub carrier is:

$$\overline{S_k} = \frac{\sum_q S_{qk}w_{qk}^*}{\sum_q w_{qk}^*} = \frac{\sum_q (|S_{qk}|^2/N_{qk})}{\sum_q (S_{qk}^*/N_{qk})} \tag{9}$$

Normally the adaptive combiner is positioned after the channel correction block in each processing branch, therefore the signal of the $k^{th}$ sub carrier in each branch theoretically has an identical value. Thus the weight vector can be simplified as:

$$W_k^T = [w_{1k}, w_{2k}, \cdots, w_{Nk}] = \left[\frac{1}{N_{1k}}, \frac{1}{N_{2k}}, \cdots, \frac{1}{N_{Nk}}\right] \tag{10}$$

where $w_{qk}$ represents the weight coefficient in $q^{th}$ branch for $k^{th}$ sub carrier. Under Equation (10), the weight coefficients are only based on the noise power in the related channels. Known techniques can be used to measure the channel noise.

Figure 7:
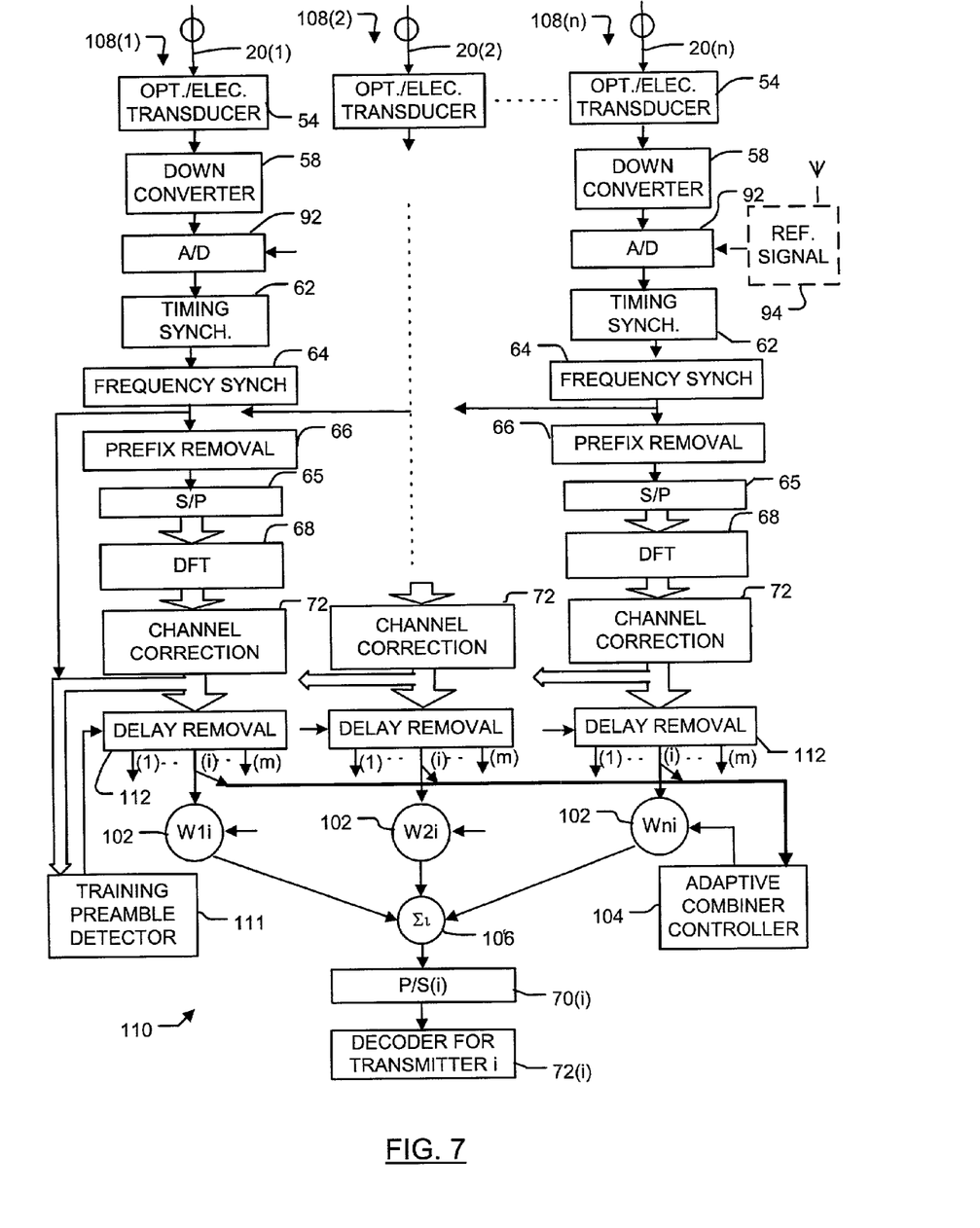
FIG. 7 shows a block diagram of yet another hub station that can be used in still a further embodiment of the communications system.

In a further embodiment of the present invention, the frames of OFDM symbols transmitted by each of the transmitters 18(1) to 18(m) each include a preamble having special predetermined training symbols. At the hub station, the training symbols can be used to eliminate delay spread caused by the differences between communications links 20(1) to 20(n) without the need for a common clock reference. FIG. 7 shows a block diagram of a further hub station 110 for use in this further embodiment of the invention. The hub station 110 is similar in operation to the hub station 100 except for the differences noted below and in the Figures. In this embodiment, removal of delay differences that are due to the wired links occurs in processing branches 108(1)–108(n) after the signals from different transmitters 18(1) to 18(m) have been corrected at channel correction block 72. Each processing branch includes a training preamble detector 111 and a delay removal block 112 that receive the transmitter specific signals output from the correction block 72. Each delay removal block 112 is configured to point to the same current symbol of an OFDM frame in all branches from a particular transmitter based on the presence of the predetermined preamble training symbol, and to buffer its output accordingly to synchronize OFDM symbols from the different branches 108(1)–108(n), thereby reducing any multipath effects that are due to differences between wired communications links 20(1)–20(n). An additional function of the delay removal block 112 is to compensate the differences of the sample frequencies between the A/D converters in the branches 108(1) to 108(n). Although a common reference signal source 94 is not necessarily required in this embodiment, its presence can assist in reducing phase noise.

Figure 8:
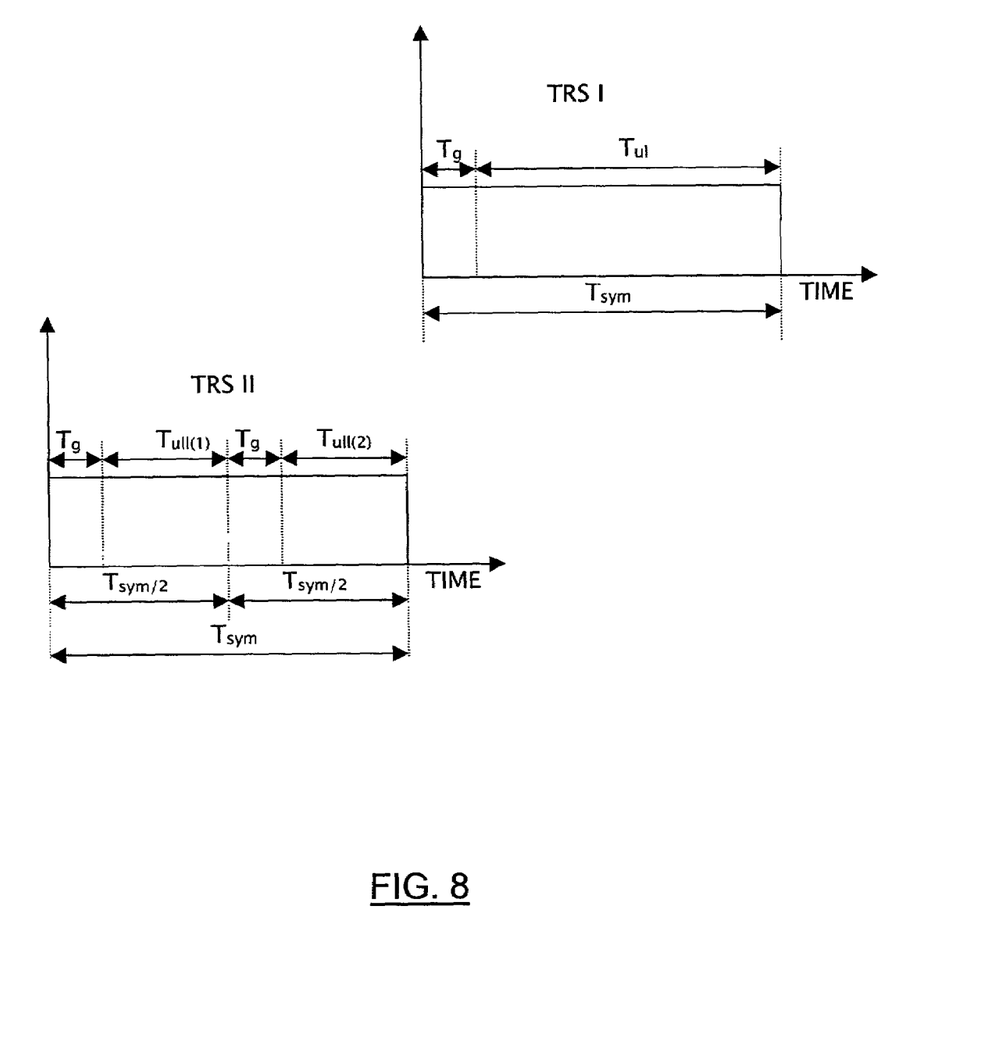
FIG. 8 shows the envelope of two preferred preamble training symbols used in an embodiment of the invention.

In this embodiment, it is preferable to use a predetermined preamble training symbol that can easily be distinguished from normal OFDM symbols. Preferably, each mobile transmitter 18(1)–18(m) is configured to transmit the same training symbol at the same location in the frame preamble. A suitable training symbol structure is described in co-pending U.S. patent application Ser. No. 09/702,606, entitled ADAPTIVE ANTENNA ARRAY FOR MOBILE COMMUNICATIONS, filed Nov. 1, 2000, now U.S. Pat. No. 369,758, assigned to the assignee of the present invention. FIG. 8 shows the envelopes of two alternative preferred training symbols, TRSI and TRSII, that are described in such application. The preferred training symbols include pseudo random noise, and have a bandwidth that is preferably close to, but not wider than the bandwidth allocated to each transmitter 18(1)–18(m).

The training symbol TRS I has a total symbol duration of $T_{sym}$, including a useful portion having an interval of $T_{uI}$ and a cyclic prefix guard portion having a interval of $T_g$. The useful portion of the TRS I symbol duration is preferably consistent with that of the OFDM symbols used in the communications system 10 (ie. $T_{uI}$=inverse of OFDM sub-carrier spacing). The base band analytic expression for the useful interval of TRS I can be represented as follows:

$$S_{TRSI}(t) = A_{TRSI} e^{jP(t)}, t \in T_{uI} \quad (11)$$

Where:
P(t) is a pseudo random phase function;
$A_{TRSI}$ is an amplitude; and
$T_{uI}$ is the useful symbol interval of TRS I.

The pseudo random phase function P(t) is defined in more detail in the following equations:

$$\begin{cases} |P(t_{n+1}) - P(t_n)| \leq \pi \\ P(t) = P(t_n) + \frac{P(t_{n+1}) - P(t_n)}{T_{samp}} (t - t_n), t \in [t_n, t_{n+1}] \end{cases} \quad (12)$$

Where:
$P(t_n)$ are pseudo random samples;
the sample interval $T_{samp} = t_{n+1} - t_n = 1/B$; and
B is the bandwidth allocated to the transmitter 18(i).

The amplitude $A_{TRSI}$ should preferably be so chosen that the power of TRS I is equal to the average power of the OFDM symbols transmitted in a frame. The training symbol TRS I, as defined above, has sufficient bandwidth. To ensure that the bandwidth of TRS I does not exceed the assigned bandwidth., appropriate pre-transmission filtering can be applied to TRS I at the transmitter 18(i).

The training symbol TRS II actually includes two identical sub-symbols, having a combined total duration of $T_{sym}$. Each sub-symbol has a duration of $T_{sym/2}$, where $T_{sym/2} = T_{sym}/2$, each sub-symbol duration including a useful portion interval of $T_{uII(1)}$ and $T_{uII(2)}$, respectively ($T_{uII(1)} = T_{uII(2)}$) and a cyclic prefix guard interval of $T_g$. The base band analytic expression for the useful interval of each of the sub-symbols of TRS II can be represented as follows:

$$S_{TRSII}(t) = A_{TRSII} e^{jP(t)}, t \in T_{uII(2)} \quad (13)$$

Where:
P(t) is a pseudo random phase function as defined above; and
$A_{TRSII}$ is the amplitude;
$T_{uII(2)}$ is the useful symbol interval of the sub-symbol.
$A_{TRSII}$ is preferably chosen so that the power of training symbol TRS II is equal to the average power of the OFDM symbols in the frame transmitted by transmitter 18(i).

Similar to TRS I, the training symbol TRS II defined above has sufficient bandwidth. To ensure the bandwidth does not exceed the assigned channel bandwidth, appropriate pre-transmission filtering can be applied to TRS II.

The use of a training symbol TRS II having two identical sub-symbols permits the adaptive antenna array to use correlation techniques to distinguish between a desired signal and an interfering jamming signal because training symbol TRSII has better correlation properties than training symbol TRS I. The training symbol need not be limited to two identical portions, but can include more than two identical portions. so long as correlation within the symbol duration is possible.

It will be understood that in some cases, for example if there is no transmitter in the associated coverage areas of a base station, no preamble will be detectable on the associated branch. In such situations the output for this branch can be discarded by the hub station. A suitable algorithm for detecting the presence of the preamble is as follows. Based on the properties of the training symbols TRS I and TRS II the following conditions of the correlation coefficient $\rho_q$ and the power index $\alpha_q$ in $q^{th}$ processing branch are checked to determine whether the preamble is detected:

$$\rho_q = \frac{|\varphi_{y_q y_q}|}{\overline{p_q}} > \rho_{thresh} \quad (14)$$

and $$\alpha_q = \frac{\sum_k p_{q,k}}{\overline{p_q}} << 1 \quad (15)$$

Where:

$$\overline{p_q} = \frac{1}{T_{sym}} \int_0^{T_{sym}} |y_q(t)|^2 dt \quad (16)$$

$$\varphi_{y_q y_q} = \begin{cases} \frac{1}{T_g} \int_0^{T_g} y_q(t) y_q^*(t + T_{uI}) dt & \text{for TRS I} \\ \frac{2}{T_{sym} - 2T_g} \int_{T_g}^{T_{sym}+2} y_q(t) y_q^*(t + T_{uII}) dt & \text{for TRS II} \end{cases} \quad (17)$$

And $y_q(t)$ is the signal output from branch 108(q), $p_{q,k}$ is the $k^{th}$ sub carrier's power in branch 108(q) measured in the current OFDM symbol slot.

The training symbols TRSI and TRSII could also be used by timing and frequency synchronizer 62 for timing and frequency correction.

Figure 9:
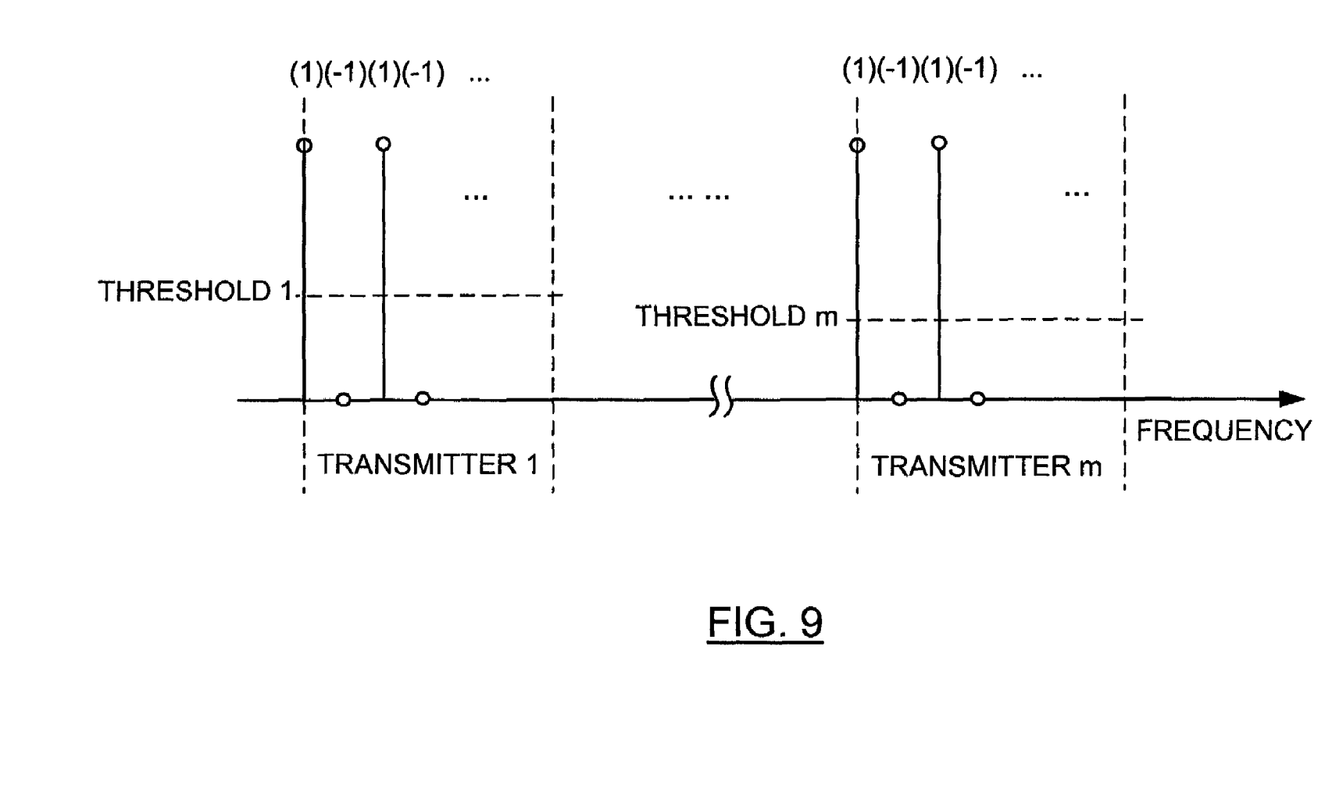
FIG. 9 shows the spectrum of another preamble training symbol used in an embodiment of the invention.

A third training symbol TRS III can be used not only to eliminate the delay spread between the branches, but also to detect whether the signal transmitted by a particular transmitter appears in a branch or not. TRS III has a spectrum as shown in FIG. 9. The numbers in the brackets in FIG. 9 indicate the amplitudes of the sub-carriers in the training symbol TRS III. The number (1) means the presence of a corresponding sub-carrier with the same amplitude and the number (−1) means the absence of a corresponding sub-carrier. The spectrum pattern of TRS III can be designed arbitrarily but must be easily distinguished from any other OFDM symbols. An example of the spectrum pattern that is shown in FIG. 9 can be [1,−1,1,−1,1, −1 . . . ]. The phases of the sub-carriers in TRS III can be arbitrary or have some preferred pattern.

Suppose the $q^{th}$ branch (base station) is responsible for reception of signals from m assigned transmitters. Each transmitter uses its assigned K sub-carriers. The spectrum pattern for each transmitter is the same except that it represents different sub-carriers. Let the vector $U_{qi}$ represent the spectrum pattern for the $i^{th}$ transmitter in the $q^{th}$ branch, such that:

$$U_{qi} = U_{q1} = \ldots = U_{qm} = \underbrace{[1, -1, 1, -1, 1, -1 \ldots]}_{K \text{ subcarriers}} \quad (18)$$

The complete desired spectrum pattern in the $q^{th}$ branch should be:

$$U_q = [U_{q1}, U_{q2}, \ldots, U_{qm}] = \underbrace{[1, -1, 1, -1, 1, -1 \ldots]}_{m \cdot K \text{ subcarriers}} \quad (19)$$

(It is assumed in equations (18) and (19) that each transmitter 18(i) has the same number of assigned sub-carriers, however, the algorithm could be modified accordingly for systems in which different transmitters were assigned different numbers of subcarriers.)

When transmitted data is received, the signal power of the sub-carriers assigned to the $i^{th}$ transmitter is checked to determine if the signal from the $i^{th}$ transmitter appears (over a certain threshold):

$$p_{qt} = \sum_{k=1}^{K} |S_{qik}|^2 \geq p_{qi,thres} \quad (20)$$

If the signal from the transmitter appears, then the spectrum pattern from the $i^{th}$ transmitter, $I'_{qi}$, is estimated, as follows:

$$V_{qi} = [V_{qi1}, V_{qi2}, \ldots, V_{qiK}] \quad (21)$$

$$v_{qtk} = \begin{cases} +1, & |S_{qtk}| \geq S_{qi,thres} \\ -1, & |S_{qtk}| < S_{qi,thres} \end{cases} \quad (22)$$

Where $S_{qi,thres}$ can be calculated, for example, as follows:

$$S_{qt,thres} = \frac{0.1}{K} \sum_{k=1}^{K} |S_{qik}| \quad (23)$$

The complete estimated spectrum pattern in the $q^{th}$ branch is then combined by the spectrum patterns of the transmitters detected:

$$V_q = [\ldots, V_{qi}, \ldots] \quad (24)$$

Note that only the spectrum patterns of detected transmitters are included in $V_q$. Let $U'_q$ represent the desired spectrum pattern that is combined by the desired spectrum patterns of the transmitters in accordance with the transmitter, included in $V_q$ and also arranged in the same order. If the index $\gamma_q$ that is calculated from $V_q$ and $U'_q$ is bigger than $\gamma_{q,thres}$, it indicates that TRS III is detected:

$$\gamma_q = \frac{V_q^T U'_q}{\|V_q\| \cdot \|U'_q\|} \geq \gamma_{q,thres}. \quad (25)$$

The threshold value can be chosen, for example, as $$\gamma_{q,thres} = \cos\frac{\pi}{8} \approx 0.9239 \quad (26)$$

Although the communications system 10 has been described largely in the context of an ENG system, it could also be used for other uplink data, and could be used as part of a two-way communication system as well. It will also be appreciated that some of the the hub station processing steps could be distributed, rather than centralized at one location. While the invention has been described in terms of various specific embodiments, those skilled in the art will recognize that the invention can be practiced with modification within the spirit and scope of the claims.

We claim:

1. A communications system for transferring information from a wireless transmitter to a hub station, comprising:
a plurality of wireless transmitters, each configured to transmit a data signal as successive OFDM symbols with training symbols included among the OFDM symbols;
a plurality of base stations, each configured to receive the OFDM symbols from the wireless transmitters located in a corresponding coverage area and relay the received OFDM symbols to the hub station, at least some of said base stations having overlapping coverage areas such that more than one base station can receive OFDM symbols from the same mobile transmitter;
the hub station configured to receive the OFDM symbols from the base stations and demodulate the OFDM symbols and output an estimate of the data signals from the wireless transmitters, wherein each of the base stations is connected to the hub station by a substantially independent communications link and the hub station is configured to reduce differences in propagation delays between at least some of the communications links by measuring time differences of training symbols detected on the at least some communications links and buffering the symbols from the at least some communications links based on the measured time differences.

2. The communications system of claim 1 wherein the communications system is used as a mobile electronic gathering system, including a video camera and audio transducer coupled to at least one of the wireless transmitters, the at least one wireless transmitter being a mobile transmitter configured to receive video and audio signals from the video camera and audio transducer for inclusion in the data signal.

3. The communications system of claim 1 wherein at least some of the base stations are connected to the hub station by wired communications links.

4. The communications system of claim 1 wherein the hub station is configured to, after reducing the differences in propagation delays between the at least some communications links, combine signals received from the different base stations.

5. The communications system of claim 4 wherein at least some of the base stations are connected to the hub station by independent wired communications links having predetermined propagation delays, the hub station including buffering to substantially eliminate, prior to combining signals received on the communications links, any delay spread resulting from the predetermined propagations delays.

6. The communications system of claim 4 wherein the hub station is configured to adaptively combine the signals received from each of the base stations based on measured signals characteristics.

7. The communications system of claim 1 wherein the wireless transmitters share a common communications channel, the wireless transmitters each being configured to receive a common reference signal to synchronize sharing of the channel.

8. The communications system of claim 7 wherein the common reference signal is a GPS signal.

9. The communications system of claim 1 wherein the training symbols transmitted by the wireless transmitters include psuedo-random training symbols, the hub station being configured to determine, for at least some of the base stations, if the at least some of the base stations have received a transmission from the wireless transmitters by checking for the presence of the psuedo-random training symbols in signals received from the at least some of the base stations.

10. A method for processing data signals that are transmitted by a mobile wireless transmitter as a series of OFDM symbols with training symbols included among the OFDM symbols, said method comprising:

(a) receiving at a plurality of base stations the data signals transmitted from the mobile wireless transmitter, and relaying the received data signals from the plurality of base stations to a hub station, the base stations each having a substantially independent communications link with the hub station over which the received data signals are relayed;

(b) receiving at the hub station the data signals relayed from the plurality of base stations;

(c) reducing differences in propagation delays between at least some of the communications links by measuring time differences of the training symbols included in the data signals relayed over communications links and buffering the data signals from the at least some communications links based on the measured time differences.

11. A receiver network for receiving from at least one wireless transmitter data signals that include successive OFDM symbols, comprising:

a plurality of spaced apart base stations configured to substantially simultaneously receive the OFDM symbols from the at least one wireless transmitter and transmit the OFDM symbols to a hub station;

the hub station configured to receive and demodulate the OFDM symbols from the base stations wherein each of the base stations is connected to the hub station by a substantially independent communications link and training symbols are included among the OFDM symbols, wherein the hub station is configured to reduce differences in propagation delays between the communications links by measuring time differences of training symbols detected on the communications links and buffering the symbols from the communications links based on the measured time differences.

12. The receiver network of claim 11 wherein the hub station is configured to perform a separate discrete Fourier transform on the OFDM symbols received from at least some of the different base stations, and combine the transformed symbols based on measured signal characteristics.

13. The receiver network of claim 12 wherein the hub station is configured to combine the transformed symbols based on noise characteristics of signals received from the independent wired links.

14. The receiver network of claim 12 wherein the hub station is configured to determine which base stations have received a transmission from the wireless transmitter by checking for the presence of the training symbols in signals received from the base stations.

15. The receiver network of claim 14 wherein the training symbols are predetermined psuedorandom symbols.

16. The receiver network of claim 14 wherein the training symbols comprise OFDM symbols having predetermined characteristics distinguishable from OFDM symbols used to transmit useful data, the hub station being configured to determine the presence of the training symbols by determining if the signal power of subcarriers associated with the at least one wireless transmitter exceed a threshold value.

17. A communications system for transferring information from a wireless transmitter to a hub station, comprising:

a plurality of wireless transmitters, each configured to transmit a data signal as successive OFDM symbols;

a plurality of base stations, each configured to receive the OFDM symbols from the wireless transmitters located in a corresponding coverage area and relay the received OFDM symbols to the hub station, at least some of said base stations having overlapping coverage areas such that more than one base station can receive OFDM symbols from the same mobile transmitter;

the hub station configured to receive the OFDM symbols from the base stations and demodulate the OFDM symbols and output an estimate of the data signals from the wireless transmitters, wherein the hub station includes:

(i) a plurality of parallel OFDM symbol processing circuits, each processing circuit being associated with a respective base station for receiving OFDM symbols therefrom and performing at least some demodulation steps on the received OFDM symbols, wherein the processing circuits each include a down converter for down converting the OFDM symbols received from the base station associated therewith, an analog to digital converter for converting the down converted OFDM symbols to digital signals, and a delay removal buffer for buffering the digital signals to accommodate for propagation differences between the different base stations and the hub station; and (ii) a summer for combining the outputs of the processing circuits to produce the estimate of the data signals from the wireless transmitters.

18. The communications system of claim 17 including a common reference source for providing a common clock signal to the delay removal buffers.

19. The communications system of claim 17 wherein the OFDM symbols include training symbols, the delay removal buffers being configured to buffer the digital signals based on timing of detected training symbols.

20. The communications system of claim 17 wherein each of the processing circuits includes a discrete Fourier transform module for performing a discrete Fourier transform on the symbols processed thereby.

21. The communications system of claim 17 wherein the hub station includes an adaptive combiner controller for receiving representations of the OFDM symbols received from each of the base stations and determining signal characteristics thereof, the processing circuits each including a complex weighting device tesponsive to the adaptive combiner controller for applying a weighting factor to the symbols processed thereby based on the determined signal characteristics.

22. The receiver network of claim 11 wherein at least one of the training symbols include at least two identical sub-symbols.

23. The method of claim 10 including:
(d) combining the data signals at the hub station subsequent to reducing the differences in propagation delays.

* * * * *